(12) United States Patent
Stamoulis et al.

(10) Patent No.: US 8,761,312 B2
(45) Date of Patent: Jun. 24, 2014

(54) SELECTION OF A THRESHOLDING PARAMETER FOR CHANNEL ESTIMATION

(75) Inventors: Anastasios Stamoulis, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1485 days.

(21) Appl. No.: 11/351,683

(22) Filed: Feb. 10, 2006

(65) Prior Publication Data

US 2006/0227748 A1    Oct. 12, 2006

Related U.S. Application Data

(60) Provisional application No. 60/652,236, filed on Feb. 11, 2005.

(51) Int. Cl.
     *H04L 27/06*      (2006.01)
(52) U.S. Cl.
     USPC ......................................................... 375/340
(58) Field of Classification Search
     USPC ......... 375/142, 143, 144, 148, 150, 152, 316, 375/343, 346; 455/63.1, 114.2, 278.1, 296; 370/332, 322
     See application file for complete search history.

(56) References Cited

U.S. PATENT DOCUMENTS

| | | | |
|---|---|---|---|
| 4,409,593 A | 10/1983 | Bose | |
| 5,251,223 A | 10/1993 | Hiroshima | |
| 5,251,233 A * | 10/1993 | Labedz et al. | ................ 375/230 |
| 5,541,956 A | 7/1996 | Ueda | |
| 6,393,068 B1 | 5/2002 | Rupp | |
| 6,408,023 B1 | 6/2002 | Abdesselem et al. | |
| 6,907,092 B1 * | 6/2005 | Yakhnich et al. | ............. 375/346 |
| 7,149,239 B2 * | 12/2006 | Hudson | ........................ 375/144 |
| 7,203,257 B2 | 4/2007 | Fimoff et al. | |
| 7,359,431 B2 | 4/2008 | Kwon et al. | |

(Continued)

FOREIGN PATENT DOCUMENTS

| | | |
|---|---|---|
| EP | 0966113 | 12/1999 |
| JP | 2000091968 | 3/2000 |

(Continued)

OTHER PUBLICATIONS

International Search Report—PCT/US2006/005185, International Search Authority—European Patent Office—Jun. 19, 2006.

(Continued)

*Primary Examiner* — Khanh C Tran
(74) *Attorney, Agent, or Firm* — Abdollah Katbab

(57) ABSTRACT

Techniques for deriving a high quality channel estimate are described. A first channel impulse response estimate (CIRE) having multiple channel taps is derived, e.g., by filtering initial CIREs obtained from a received pilot. A threshold parameter value is selected based on at least one criterion, which may relate to channel profile, operating SNR, number of channel taps, and so on. A second CIRE is derived by zeroing out selected ones of the channel taps in the first CIRE based on the threshold parameter value. The average energy of the channel taps may be determined, a threshold may be derived based on the average energy and the threshold parameter value, and channel taps with energy less than the threshold may be zeroed out. A memory may store threshold parameter values for different operating scenarios, and a stored value may be selected for use based on the current operating scenario.

22 Claims, 6 Drawing Sheets

(56) References Cited

U.S. PATENT DOCUMENTS

| | | | | |
|---|---|---|---|---|
| 2002/0176485 A1* | 11/2002 | Hudson | | 375/144 |
| 2003/0043887 A1* | 3/2003 | Hudson | | 375/144 |
| 2006/0128326 A1* | 6/2006 | Pietraski | | 455/130 |

FOREIGN PATENT DOCUMENTS

| | | | |
|---|---|---|---|
| JP | 2002252575 | A | 9/2002 |
| JP | 2004104225 | A | 4/2004 |
| JP | 2004266814 | | 9/2004 |
| JP | 2005051404 | A | 2/2005 |
| JP | 2006262039 | A | 9/2006 |
| JP | 2006295293 | A | 10/2006 |
| RU | 2144733 | | 1/2000 |
| RU | 2157053 | | 9/2000 |
| RU | 2214686 | | 10/2003 |
| SU | 1225023 | | 4/1986 |
| WO | 0145296 | | 6/2001 |
| WO | WO0209297 | A2 | 1/2002 |
| WO | 02082683 | | 10/2002 |

OTHER PUBLICATIONS

International Preliminary Examination Report—PCT/US2006/005185, International Search Authority—European Patent Office—Aug. 14, 2007.

Written Opinion—PCT/US2006/005185, International Search Authority—European Patent Office—Aug. 11, 2007.

Taiwan Search Report—TW095104643—TIPO—Aug. 30, 2012.

* cited by examiner

SELECTION OF A THRESHOLDING PARAMETER FOR CHANNEL ESTIMATION

CLAIM OF PRIORITY UNDER 35 U.S.C. §119

The present Application for Patent claims priority to Provisional Application Ser. No. 60/652,236, entitled "SELECTION OF A THRESHOLDING PARAMETER FOR CHANNEL ESTIMATION," filed Feb. 11, 2005, assigned to the assignee hereof, and expressly incorporated herein by reference.

BACKGROUND

I. Field

The present disclosure relates generally to communication, and more specifically to techniques for deriving a channel estimate for a communication channel.

II. Background

In a communication system, a transmitter typically processes (e.g., encodes, interleaves, and symbol maps) traffic data to generate data symbols, which are modulation symbols for data. For a coherent system, the transmitter multiplexes pilot symbols with the data symbols, processes the multiplexed data and pilot symbols to generate a radio frequency (RF) signal, and transmits the RF signal via a communication channel. The channel distorts the RF signal with a channel response and further degrades the RF signal with noise and interference.

A receiver receives the transmitted RF signal and processes the received RF signal to obtain samples. For coherent data detection, the receiver estimates the response of the communication channel based on the received pilot and derives a channel estimate. The receiver then performs data detection (e.g., equalization) on the samples with the channel estimate to obtain data symbol estimates, which are estimates of the data symbols sent by the transmitter. The receiver then processes (e.g., demodulates, deinterleaves, and decodes) the data symbol estimates to obtain decoded data.

The quality of the channel estimate may have a large impact on data detection performance and may affect the quality of the symbol estimates as well as the correctness of the decoded data. There is therefore a need in the art for techniques to derive a high quality channel estimate in a communication system.

SUMMARY

Techniques for deriving a high quality channel estimate are described herein. According to an embodiment of the invention, an apparatus is described which includes at least one processor and a memory. The processor(s) derive a first channel impulse response estimate (CIRE) having multiple channel taps. The processor(s) may derive initial CIREs based on a received pilot and may filter the initial CIREs to obtain the first CIRE. The processor(s) select a threshold parameter value based on at least one criterion, which may relate to channel profile, operating signal-to-noise ratio (SNR), expected channel delay spread, number of channel taps, and so on. The processor(s) derive a second CIRE by zeroing out selected ones of the channel taps in the first CIRE based on the threshold parameter value. The processor(s) may determine the average energy of the channel taps, derive a threshold based on the average energy and the threshold parameter value, and zero out channel taps with energy less than the threshold. The memory may store a table of threshold parameter values for different operating scenarios. The processor(s) may select one of the stored threshold parameter values based on the current operating scenario.

According to another embodiment, a method is provided in which a first CIRE having multiple channel taps is derived. A threshold parameter value is selected based on at least one criterion. A second CIRE is derived by zeroing out selected ones of the multiple channel taps based on the threshold parameter value.

According to yet another embodiment, an apparatus is described which includes means for deriving a first CIRE having multiple channel taps, means for selecting a threshold parameter value based on at least one criterion, and means for deriving a second CIRE by zeroing out selected ones of the multiple channel taps based on the threshold parameter value.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The channel estimation techniques described herein may be used for various communication systems such as a Code Division Multiple Access (CDMA) system, a Time Division Multiple Access (TDMA) system, a Frequency Division Multiple Access (FDMA) system, an orthogonal frequency division multiplexing (OFDM) system, an orthogonal frequency division multiple access (OFDMA) system, a single-carrier FDMA (SC-FDMA) system, and so on. A CDMA system may implement one or more radio access technologies (RATs) such as Wideband-CDMA (W-CDMA), cdma2000, and so on. cdma2000 covers IS-2000, IS-856, and IS-95 standards. A TDMA system may implement a RAT such as Global System for Mobile Communications (GSM). These various RATs and standards are known in the art. An OFDM system may be an IEEE 802.11a/g system, a Digital Video Broadcasting for Handhelds (DVB-H) system, an Integrated Services Digital Broadcasting for Terrestrial Television Broadcasting (ISDB-T) system, and so on. An OFDMA system transmits modulation symbols in the frequency domain on orthogonal frequency subbands using OFDM. An SC-FDMA system transmits modulation symbols in the time domain on orthogonal frequency subbands. For clarity, the techniques are described below for a system with multiple frequency subbands, which may be an OFDM, OFDMA, or SC-FDMA system.

Figure 1:
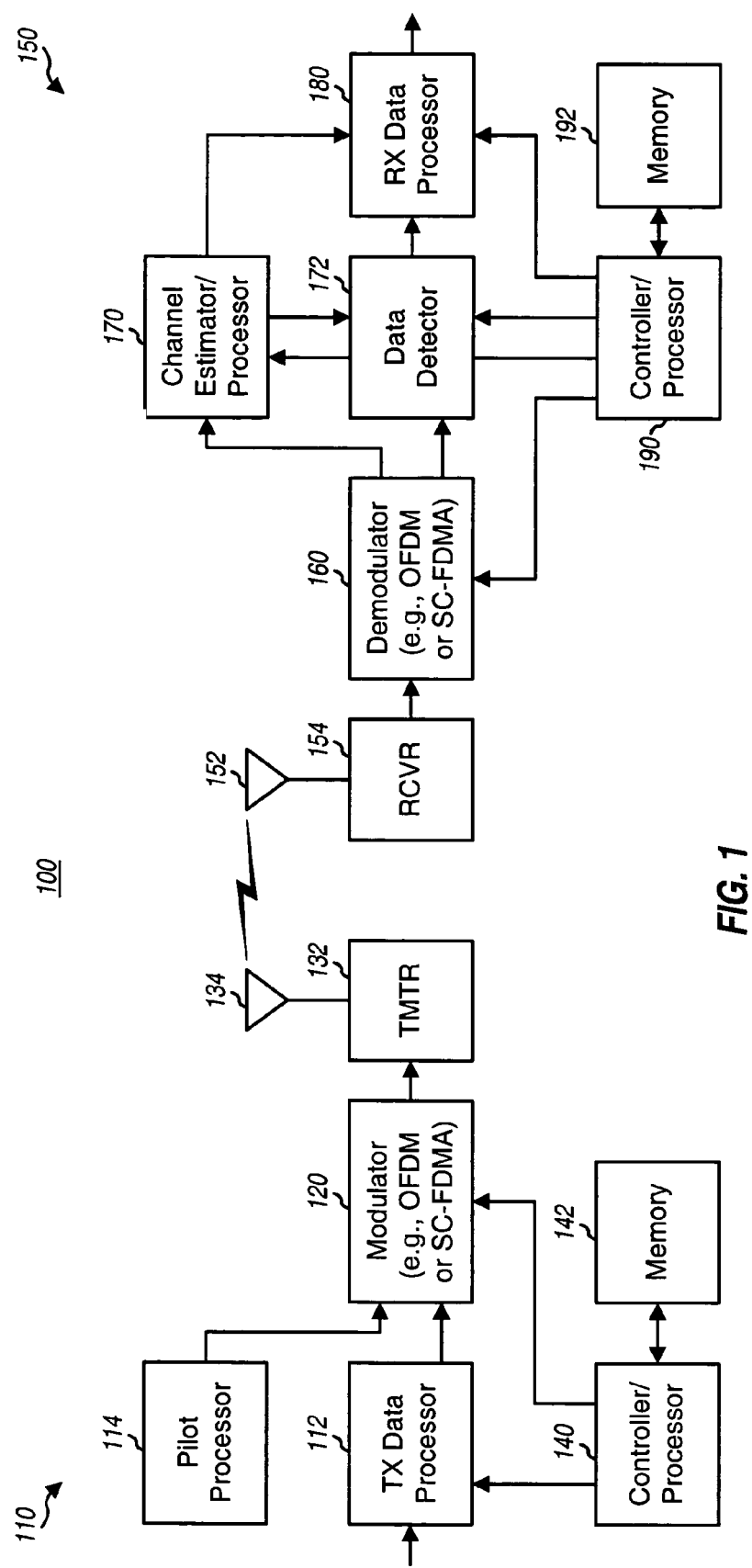
FIG. 1 shows a block diagram of a transmitter and a receiver.

FIG. 1 shows a block diagram of a transmitter 110 and a receiver 150 in a wireless communication system 100. For simplicity, transmitter 110 and receiver 150 are each equipped with a single antenna. For the downlink (or forward link), transmitter 110 may be part of a base station, and receiver 150 may be part of a terminal. For the uplink (or reverse link), transmitter 110 may be part of a terminal, and receiver 150 may be part of a base station. A base station is typically a fixed station and may also be called a base transceiver system (BTS), an access point, a Node B, or some other terminology. A terminal may be fixed or mobile and may be a wireless device, a cellular phone, a personal digital assistant (PDA), a wireless modem card, and so on. The channel estimation techniques described herein may be used for a terminal as well as a base station.

At transmitter 110, a transmit (TX) data processor 112 processes (e.g., encodes, interleaves, and symbol maps) traffic data and generates data symbols. A pilot processor 114 generates pilot symbols. As used herein, a data symbol is a modulation symbol for data, a pilot symbol is a modulation symbol for pilot, a modulation symbol is a complex value for a point in a signal constellation (e.g., for PSK or QAM), and a symbol is generally a complex value. A modulator 120 multiplexes the data symbols and pilot symbols, performs modulation (e.g., for OFDM or SC-FDMA) on the multiplexed data and pilot symbols, and generates transmission symbols. A transmission symbol may be an OFDM symbol or an SC-FDMA symbol and is sent in one symbol period. A transmitter unit (TMTR) 132 processes (e.g., converts to analog, amplifies, filters, and frequency upconverts) the transmission symbols and generates an RF signal, which is transmitted via an antenna 134.

At receiver 150, an antenna 152 receives the RF signal from transmitter 110 and provides a received signal to a receiver unit (RCVR) 154. Receiver unit 154 conditions (e.g., filters, amplifies, frequency downconverts, and digitizes) the received signal and provides input samples. A demodulator 160 performs demodulation (e.g., for OFDM or SC-FDMA) on the input samples to obtain received symbols. Demodulator 160 provides received pilot symbols to a channel estimator/processor 170 and provides received data symbols to a data detector 172. Channel estimator/processor 170 derives channel estimates for the wireless channel between transmitter 110 and receiver 150 based on the received pilot symbols. Data detector 172 performs data detection (e.g., equalization or matched filtering) on the received data symbols with the channel estimates and provides data symbol estimates, which are estimates of the data symbols sent by transmitter 110. An RX data processor 180 processes (e.g., symbol demaps, deinterleaves, and decodes) the data symbol estimates and provides decoded data. In general, the processing at receiver 150 is complementary to the processing at transmitter 110.

Controllers/processors 140 and 190 direct the operation of various processing units at transmitter 110 and receiver 150, respectively. Memories 142 and 192 store program codes and data for transmitter 110 and receiver 150, respectively.

Figure 2:
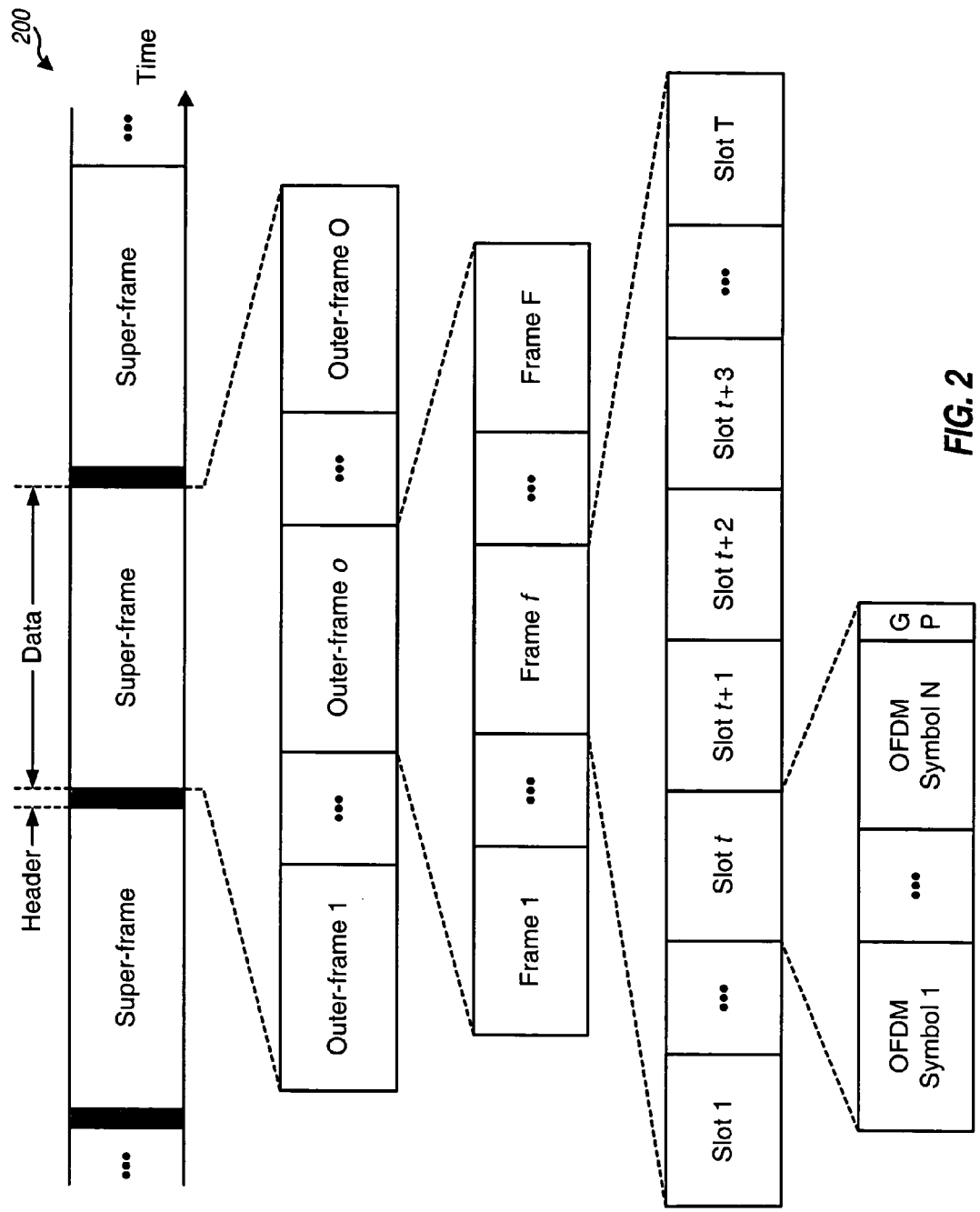
FIG. 2 shows an exemplary multi-tier frame structure.

FIG. 2 shows an exemplary multi-tier frame structure 200 that may be used for system 100. The transmission time line is partitioned into super-frames, with each super-frame having a predetermined time duration, e.g., approximately one second. Each super-frame may include (1) a header field for a time division multiplexed (TDM) pilot and overhead/control information and (2) a data field for traffic data and a frequency division multiplexed (FDM) pilot. The data field may be partitioned into multiple (O) equal-size outer-frames, each outer-frame may be partitioned into multiple (F) frames, and each frame may be partitioned into multiple (T) slots. For example, each super-frame may include four outer-frames (O=4), each outer-frame may include 32 frames (F=32), and each frame may include 15 time slots (T=15). If each frame has a duration of 10 milliseconds (ms), which conforms to W-CDMA, then each slot has a duration of 667 microseconds (μs), each outer-frame has a duration of 320 ms, and each super-frame has a duration of approximately 1.28 seconds. The super-frame, outer-frame, frame, and slot may also be referred to by some other terminology.

In an embodiment, different radio technologies may be used for different slots. For example, W-CDMA may be used for some slots, and OFDM may be used for other slots. In general, the system may support any one or any combination of radio technologies, and each slot may employ one or multiple radio technologies. A slot used for OFDM is called an OFDM slot. An OFDM slot may carry one or more (N) OFDM symbols and may further include a guard period (GP). For example, an OFDM slot may carry three OFDM symbols and a guard period, with each OFDM symbol having a duration of approximately 210 μs.

Figure 3:
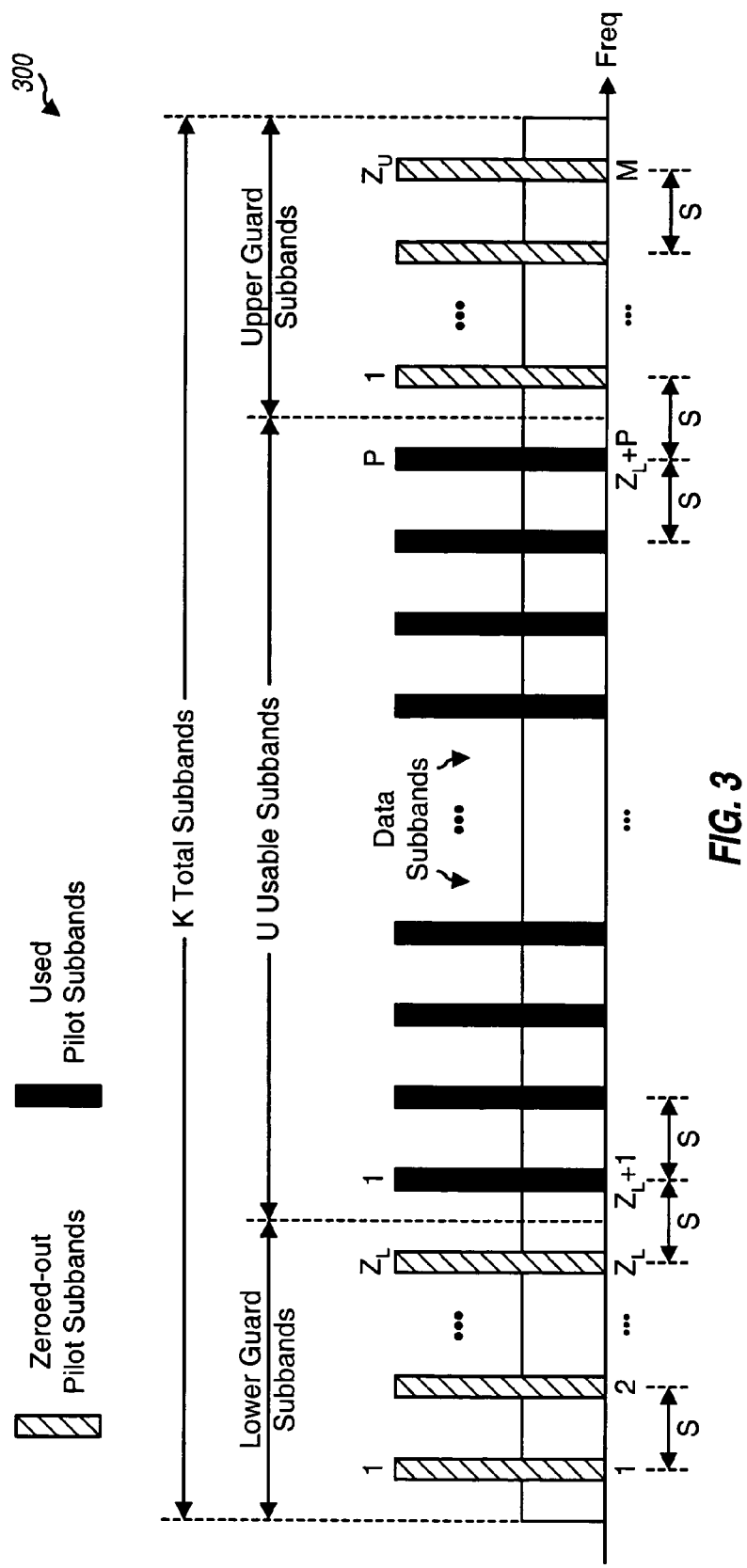
FIG. 3 shows an exemplary subband structure.

FIG. 3 shows an exemplary subband structure 300 that may be used for system 100. The system has an overall system bandwidth of BW MHz, which is partitioned into multiple (K) orthogonal subbands. K may be any integer value but is typically a power of two (e.g., 128, 256, 512, 1024, and so on) in order to simplify the transformation between time and frequency. The spacing between adjacent subbands is BW/K MHz. In a spectrally shaped system, G subbands are not used for transmission and serve as guard subbands to allow the system to meet spectral mask requirements, where typically G>1. The G guard subbands are often distributed such that $G_L \approx G/2$ guard subbands are at the lower band edge and $G_U \approx G/2$ guard subbands are at the upper band edge. The remaining U=K−G subbands may be used for transmission and are called usable subbands.

To facilitate channel estimation, a pilot may be transmitted on a set of M subbands that may be uniformly distributed across the entire system bandwidth.

Consecutive subbands in the set may be spaced apart by S subbands, where S=K/M.

Some of the subbands in the set may be among the $G_L$ lower guard subbands and would not be used for pilot transmission, and some other subbands in the set may be among the $G_U$ upper guard subbands and would also not be used for pilot transmission. For the example shown in FIG. 2, the first $Z_L$ subbands in the set are not used for pilot transmission and are called zeroed-out pilot subbands, the next P subbands in the set are used for pilot transmission and are called used pilot subbands, and the last $Z_U$ subbands in the set are zeroed-out pilot subbands, where $M=Z_L+P+Z_U$.

In one exemplary design, the system utilizes a subband structure with K=1024 total subbands, $G_L$=68 lower guard subbands, $G_U$=68 upper guard subbands, U=888 usable subbands, M=128 pilot subbands, P=111 usable pilot subbands, and C=108 chips for a cyclic prefix appended to each OFDM symbol. Other values may also be used for these parameters.

FIG. 2 shows an exemplary frame structure, and FIG. 3 shows an exemplary subband structure. The channel estimation techniques described herein may be used with various frame and subband structures.

For clarity, the following nomenclature is used in the description below. Vectors are denoted by bolded and underlined texts with subscript indicating the vector length, e.g., $\underline{h}_M$ for an M×1 vector or $\underline{H}_K$ for a K×1 vector, where the "×1" in the dimension is implicit and omitted for clarity. Matrices are denoted by bolded and underlined texts with subscript indicating the matrix dimension, e.g., $\underline{W}_{M \times K}$ for an M×K matrix. Time-domain vectors are generally denoted with lower case texts, e.g., $\underline{h}_K$, and frequency-domain vectors are generally denoted with upper case texts, e.g., $\underline{H}_K$.

The wireless channel between transmitter 110 and receiver 150 may be characterized by either a time-domain channel impulse response $\underline{h}_K$ or a corresponding frequency-domain channel frequency response $\underline{H}_K$. The relationships between the channel impulse response and the channel frequency response may be expressed in matrix form as follows:

$$\underline{H}_K = \underline{W}_{K \times K} \cdot \underline{h}_K, \text{ and} \qquad \text{Eq (1)}$$

$$\underline{h}_K = \underline{W}_{K \times K}^{-1} \cdot \underline{H}_K, \qquad \text{Eq (2)}$$

where $\underline{h}_K$ is a K×1 vector for the impulse response of the wireless channel, $\underline{H}_K$ is a K×1 vector for the frequency response of the wireless channel, $\underline{W}_{K \times K}$ is a K×K Fourier matrix, $$\underline{W}_{K \times K}^{-1} = \frac{1}{M} \cdot \underline{W}_{K \times K}^{H}$$

is a K×K inverse Fourier matrix, and

"H" denotes a conjugate transpose.

Equation (1) indicates that the channel frequency response is the fast Fourier transform or discrete Fourier transform (FFT/DFT) of the channel impulse response. Equation (2) indicates that the channel impulse response is the inverse FFT or inverse DFT (IFFT/IDFT) of the channel frequency response. The element in row r and column c of the Fourier matrix $\underline{W}_{K \times K}$ may be given as:

$$w_{r,c} = e^{-j2\pi \frac{(r-1)(c-1)}{K}},$$

for $r = 1, \ldots, K$ and $c = 1, \ldots, K$. Eq (3)

The "−1" in the exponent in equation (3) is due to indices r and c starting with 1 instead of 0.

Transmitter 110 transmits data and pilot symbols on the usable subbands to receiver 150. The data and pilot symbols may be assumed to have an average energy of $E_s$, or $E\{|X(k)|^2\} = E_s$, where X(k) is a symbol transmitted on subband k and $E\{\ \}$ denotes an expectation operation. For simplicity, the following description assumes that each symbol is transmitted at unit power so that $E_s = 1$.

The received symbols obtained by receiver 150 in OFDM symbol period n may be expressed as:

$$\underline{Y}_K(n) = \underline{H}_K(n) \circ \underline{X}_K(n) + \underline{\eta}_K(n). \qquad \text{Eq (4)}$$

where $\underline{X}_K(n)$ is a K×1 vector containing the transmitted symbols for the K subbands, $\underline{Y}_K(n)$ is a K×1 vector containing the received symbols for the K subbands, $\underline{\eta}_K(n)$ is a K×1 vector of noise for the K subbands, and "$\circ$" denotes an element-wise product.

Each entry of $\underline{X}_K(n)$ may be a data symbol for a data subband, a pilot symbol for a pilot subband, or a zero symbol for an unused subband (e.g., a guard subband). For simplicity, the pilot symbols may be assumed to have a complex value of $1 + j0$ and a magnitude of $\sqrt{E_s} = 1$. In this case, the received pilot symbols are simply noisy versions of the channel gains in $\underline{H}_K(n)$.

If only P pilot subbands are used for pilot transmission, as shown in FIG. 3, then the receiver may form an M×1 vector $\underline{Y}_M(n)$ containing P received pilot symbols for the P used pilot subbands and $Z_L + Z_U$ zero symbols for the zeroed-out pilot subbands. Vector $\underline{Y}_M(n)$ may be expressed as:

$$\underline{Y}_M(n) = \begin{pmatrix} 0_{Z_L} \\ \underline{Y}_P(n) \\ 0_{Z_U} \end{pmatrix}, \qquad \text{Eq (5)}$$

where $0_{Z_L}$ and $0_{Z_U}$ are vectors of all zeros, and $\underline{Y}_P(n)$ is a P×1 vector of received pilot symbols for the P used pilot subbands.

Various techniques may be used to estimate the channel impulse response based on the received pilot symbols. These techniques include a least-squares (LS) technique, a minimum mean square error (MMSE) technique, a robust MMSE technique, and a zero-forcing (ZF) technique.

A least-squares channel impulse response estimate (CIRE) $\underline{h}_M^{ls}(n)$ may be derived as:

$$\begin{aligned} \underline{h}_M^{ls}(n) &= \underline{W}_{M \times M}^{-1} \cdot \underline{Y}_M(n), \\ &= \underline{W}_{M \times M}^{-1} \cdot [\underline{W}_{M \times M} \cdot \underline{h}_M(n) + \underline{\eta}_M(n)], \\ &= \underline{h}_M(n) + \underline{W}_{M \times M}^{-1} \cdot \underline{\eta}_M(n), \end{aligned} \qquad \text{Eq (6)}$$

where $\underline{h}_M(n)$ is an M×1 channel impulse response vector with M channel taps, and $\underline{\eta}_M(n)$ is an M×1 vector of noise for the M pilot subbands. Equation (6) indicates that the least-squares CIRE may be obtained by simply taking an M-point IFFT/IDFT of the received pilot symbols in $\underline{Y}_M(n)$. A zero-forcing CIRE is equal to the least-squares CIRE.

An MMSE CIRE $\underline{h}_M^{mmse}(n)$ may be derived as:

$$\underline{h}_M^{mmse}(n) = \Psi_{hh} \cdot \underline{W}_{M \times M}^{-1} \cdot [\underline{W}_{M \times M} \cdot \Psi_{hh} \cdot \underline{W}_{M \times M}^{-1} + \Lambda_{\eta\eta}]^{-1} \cdot \underline{Y}_M(n), \qquad \text{Eq (7)}$$

where $\Psi_{hh} = E\{\underline{h}_M(n) \cdot \underline{h}_M^H(n)\}$ is an M×M channel covariance matrix, and $\Lambda_{\eta\eta} = E\{\underline{\eta}_M(n) \cdot \underline{\eta}_M^H(n)\}$ is an M×M noise covariance matrix.

A robust MMSE CIRE $\underline{h}_M^{rmmse}(n)$ may be derived as:

$$\underline{h}_M^{rmmse}(n) = \frac{1}{1 + N_0} \cdot \underline{W}_{M \times M}^{-1} \cdot \underline{Y}_M(n). \qquad \text{Eq (8)}$$

Equation (8) assumes that the taps in the channel impulse response are uncorrelated and have equal power, so that $\Psi_{hh} = I_{M \times M}$. Equation (8) further assumes that the noise $\underline{\eta}_M(n)$ is additive white Gaussian noise (AWGN) with a zero mean vector and a covariance matrix of $\Lambda_{\eta\eta} = N_0 \cdot I_{K \times K}$, where $N_0$ is the variance of the noise and $I_{K \times K}$ is a K×K identity matrix.

The receiver may derive an initial CIRE $\underline{h}'_M(n)$ for each OFDM symbol period n with pilot transmission based on received pilot symbols from the OFDM symbol sent in that symbol period. The receiver may derive $\underline{h}'_M(n)$ using the least-squares, MMSE, robust MMSE, or some other technique. Hence, $\underline{h}'_M(n)$ may be equal to $\underline{h}_M^{ls}(n)$, $\underline{h}_M^{mmse}(n)$ or $\underline{h}_M^{rmmse}(n)$.

The receiver may filter the initial CIREs $\underline{h}'_M(n)$ for different OFDM symbol periods to obtain filtered CREs $\underline{\hat{h}}_M(n)$ having improved quality. The filtering may be performed in various manners.

In an embodiment, the filtering for an "interior" OFDM symbol n that is bordered by OFDM symbol n−1 on the left side and OFDM symbol n+1 on the right side may be performed as follows:

$$\tilde{h}_M(n) = \frac{1}{4}h'_M(n-1) + \frac{1}{2}h'_M(n) + \frac{1}{4}h'_M(n+1). \quad \text{Eq (9)}$$

In equation (9), the filtered CIRE $\tilde{h}_M(n)$ for the current OFDM symbol period is determined based on the initial CIREs for the previous, current, and next OFDM symbol periods.

In an embodiment, the filtering for a "left edge" OFDM symbol n that is bordered by only OFDM symbol n+1 on the right side may be performed as follows:

$$\tilde{h}_M(n) = \frac{2}{3}h'_M(n) + \frac{1}{3}h'_M(n+1). \quad \text{Eq (10)}$$

In equation (10), the filtered CIRE $\tilde{h}_M(n)$ for the current OFDM symbol period is determined based on the initial CIREs for the current and next OFDM symbol periods.

In an embodiment, the filtering for a "right edge" OFDM symbol n that is bordered by only OFDM symbol n−1 on the left side may be performed as follows:

$$\tilde{h}_M(n) = \frac{2}{3}h'_M(n) + \frac{1}{3}h'_M(n-1). \quad \text{Eq (11)}$$

In equation (11), the filtered CIRE $\tilde{h}_M(n)$ for the current OFDM symbol period is determined based on the initial CIREs for the previous and current OFDM symbol periods.

In general, the time filtering of the initial CIREs may be performed across any number of past and/or future OFDM symbols. Furthermore, the time filtering may be performed with a finite impulse response (FIR) filter, e.g., as shown in equations (9) through (11), an infinite impulse response (IIR) filter, or some other types of filter. The filtering may also be adaptive, e.g., adjusted based on the velocity of the receiver, the rate of changes in the channel conditions, the operating SNR, and so on.

The receiver may perform thresholding on the filtered CIRE $\tilde{h}_M(n)$ to obtain a final CIRE $\hat{h}_M(n)$. The filtered CIRE $\tilde{h}_M(n)$ contains M channel taps $\tilde{h}_1(n)$ through $\tilde{h}_M(n)$. Each channel tap $\tilde{h}_m(n)$, for m=1, . . . , M, has a complex gain determined by the wireless channel. The thresholding retains channel taps with sufficient energy and discards weak channel taps.

In an aspect, the thresholding is performed in accordance with a threshold parameter and a threshold. To derive the threshold, the average channel energy for the M channel taps in $\tilde{h}_M(n)$ may be computed as follows:

$$E_{avg}(n) = \frac{1}{M} \cdot \sum_{m=1}^{M} |\tilde{h}_m(n)|^2, \quad \text{Eq (12)}$$

where $\tilde{h}_m(n)$ is the m-th channel tap in $\tilde{h}_M(n)$, and
$E_{avg}(n)$ is the average channel energy for OFDM symbol period n.

In an embodiment, the threshold is defined based on the average channel energy and the threshold parameter, as follows:

$$T_h(n) = P \cdot E_{avg}(n), \quad \text{Eq (13)}$$

where P is the threshold parameter and $T_h(n)$ is the threshold for OFDM symbol period n. The threshold parameter may also be called a threshold constant, a scaling factor, and so on.

The threshold may also be defined as $T_h(n)=P_t \cdot E_{total}(n)$, where $E_{total}(n)$ is the total channel energy and $P_t=P/M$ is a revised threshold parameter.

In general, the threshold $T_h(n)$ may be a function of any quantities. The threshold may be a function of the average channel energy and the threshold parameter, e.g., as shown in equation (13). Alternatively or additionally, the threshold may be a function of the noise energy, the energy of some number of weak channel taps, the strongest channel tap energy, and so on.

The receiver may perform thresholding of the filtered CIRE, as follows:

$$\hat{h}_m(n) = \begin{cases} \tilde{h}_m(n) & \text{if } |\tilde{h}_m(n)|^2 \geq T_h(n), \\ 0 & \text{otherwise}, \end{cases} \text{for } m=1, \ldots, M, \quad \text{Eq (14)}$$

where $\hat{h}_m(n)$ is the m-th channel tap in $\hat{h}_M(n)$. In the embodiment shown in equation (14), the thresholding is performed individually for each of the M channel taps in $\tilde{h}_M(n)$. The energy of each filtered channel tap $\tilde{h}_m(n)$ is computed and compared against the threshold $T_h(n)$. The final channel tap $\hat{h}_m(n)$ is set to the filtered channel tap $\tilde{h}_m(n)$ if the energy meets or exceeds the threshold $T_h(n)$ and is set to zero otherwise.

Figure 4:
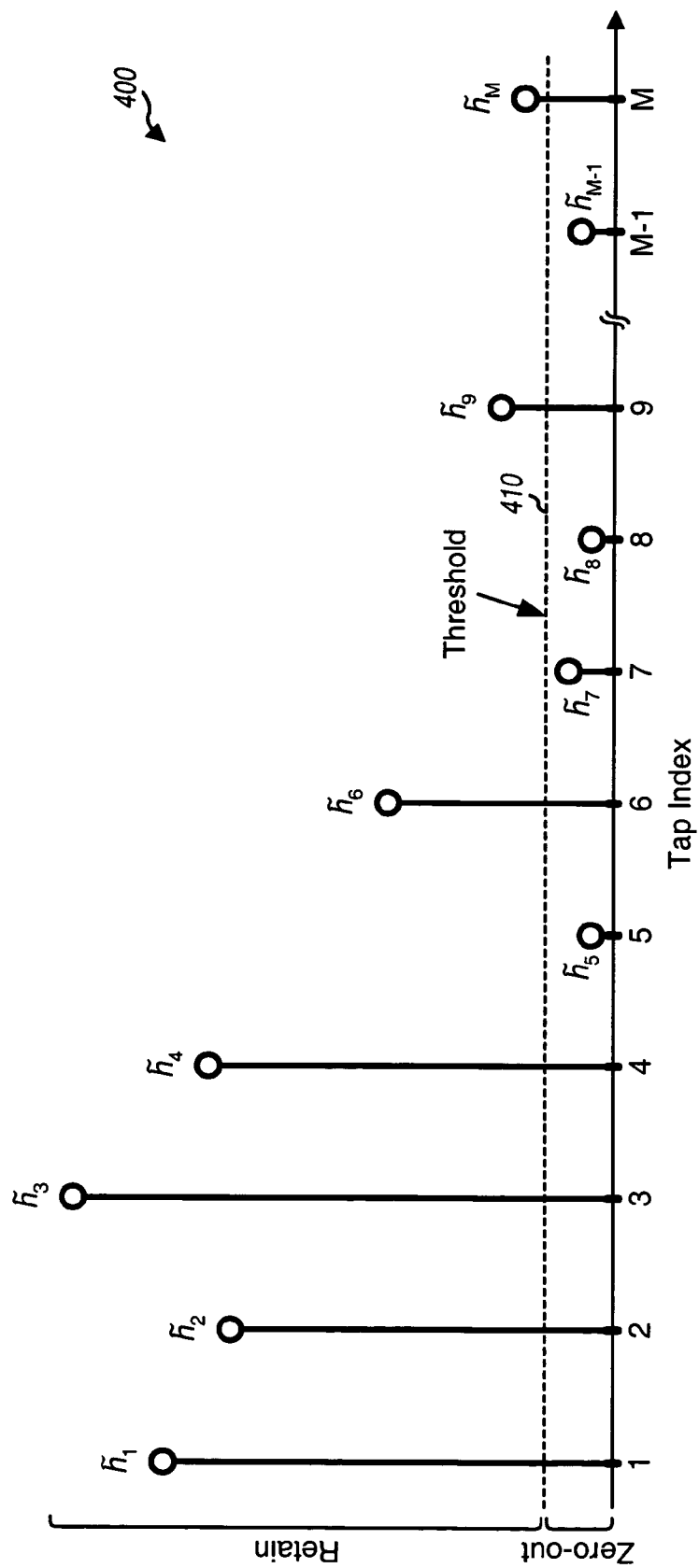
FIG. 4 illustrates thresholding for a channel impulse response estimate.

FIG. 4 illustrates thresholding for an exemplary channel impulse response estimate 400. The energies of the M filtered channel taps are shown by vertical lines with different heights at tap indices 1 through M. The threshold $T_h(n)$ is shown by a dash line 410. Channel taps with energies above line 410 are retained, and weak channel taps with energies below line 410 are zeroed out. As can be seen from FIG. 4, raising the threshold and line 410 (by increasing the threshold parameter) may result in more channel taps being zeroed out. Conversely, lowering the threshold and line 410 (by decreasing the threshold parameter) may result in more channel taps being retained.

FIG. 4 and the description above are for one thresholding embodiment. The thresholding may also be performed in other manners. For example, the channel taps may be ranked from strongest to weakest. Channel taps may then be zeroed out, one channel tap at a time starting with the weakest channel tap, until some percentage of the total energy is discarded, some percentage or number of channel taps is zeroed out, and so on. The percentage may be determined by the threshold parameter P.

The thresholding may be performed on the channel taps $\tilde{h}_m(n)$ in the filtered CIRE, as described above. The thresholding may also be performed on the channel taps $h'_m(n)$ in the initial CIRE, without filtering.

The receiver may use the final CIRE $\hat{h}_M(n)$ for various purposes such as data detection, log-likelihood ratio (LLR) computation, and so on. For example, the receiver may derive a final channel frequency response estimate $\hat{H}_K(n)$ for all K total subbands based on the final CIRE $\hat{h}_M(n)$ with M channel taps. The receiver may then perform equalization or matched filtering on the received data symbols in $Y_K(n)$ with the final channel frequency response estimate $\hat{H}_K(n)$ to obtain data symbol estimates $\hat{X}_K(n)$. The receiver may also use $\hat{H}_K(n)$ to compute LLRs for the bits of the data symbol estimates.

Computer simulations were performed for the exemplary OFDM system shown in FIGS. 2 and 3 with K=1024, G=136, U=888, M=128, P=111, and C=108. Six different operating scenarios corresponding to two channel models and three combinations of code rate and modulation scheme were simulated. For each simulated operating scenario, performance was characterized for different threshold parameter values. The simulations indicate that the threshold parameter has a large impact on both the quality of the channel estimate and performance. Table 1 gives the threshold parameter values that provide the best performance for the six operating scenarios simulated.

TABLE 1

Threshold Parameter Values with Best Performance

| Coding and Modulation | Dual Cluster Vehicle A VEHA (120 Kmph) | Pedestrian B PEDB (120 Kmph) |
|---|---|---|
| QPSK, Rate 0.55 | P = 0.75 | P = 1.00 |
| 16-QAM, Rate 0.41 | P = 0.50 | P = 0.75 |
| 16-QAM, Rate 0.55 | P = 0.25 | P = 0.50 |

VEHA and PEDB are two channel profile models that are well known in the art. A channel profile is a statistical model for a channel impulse response and is indicative of how the communication channel looks like in the time domain. A channel profile is dependent on speed and environment.

The results in Table 1 are obtained with large data block sizes and Turbo coding on data blocks sent across 12 OFDM symbols in four slots. A data block may also be called a packet, a frame, and so on. For the dual cluster VEHA model, the first cluster starts at 0 µs, the second cluster starts at 10 µs, both clusters have equal power, and the transmit pulse is a full sinc function.

Each combination of code rate and modulation scheme requires a certain minimum SNR in order to achieve a target block error rate (BLER), e.g., 1% BLER. In Table 1, the required SNR for rate 0.55 with QPSK is lower than the required SNR for rate 0.41 with 16-QAM, which is lower than the required SNR for rate 0.55 with 16-QAM. For a given modulation scheme, a higher code rate corresponds to a higher required SNR. For a given code rate, a higher order modulation scheme corresponds to a higher required SNR. Table 1 indicates that a higher threshold parameter value may provide better performance at lower SNRs for a given channel profile.

Table 1 gives results for some exemplary operating scenarios. In general, an operating scenario may be characterized by a channel profile, an operating SNR, a coding and modulation scheme, some other parameters, any one of the parameters, or any combination of the parameters. Various operating scenarios may be simulated to determine the threshold parameter values that provide the best performance for these operating scenarios. Different results may be obtained with different system parameters, channel profile models, and/or assumptions.

The proper value to use for the threshold parameter P may be determined in various manners. In one embodiment, threshold parameter values that provide good performance for various operating scenarios may be determined by computer simulations, empirical measurements, and so on, and may be stored in a look-up table. Thereafter, the current operating scenario for the receiver may be ascertained, e.g., based on the channel profile, the coding and modulation scheme, and/or other parameters applicable for the receiver. The threshold parameter value corresponding to the current operating scenario is retrieved from the look-up table and used for channel estimation.

In another embodiment, the threshold parameter value P is selected based on an expected operating SNR. The operating SNR may be estimated based on received pilot symbols and/or received data symbols. In general, a smaller threshold parameter value may be used for a higher SNR, and a larger threshold parameter value may be used for a lower SNR.

In yet another embodiment, the threshold parameter value P is selected based on the number of channel taps in the CIRE. The number of channel taps may be determined by the number of subbands used for pilot transmission, the manner in which channel estimation is performed at the receiver, and possibly other factors.

In yet another embodiment, the threshold parameter value P is determined based on a high-quality channel estimate. The receiver may obtain the high-quality channel estimate, e.g., based on a TDM pilot or via some other means. The channel profile for the receiver may be ascertained based on the high-quality channel estimate, and a threshold parameter value may be selected based on the channel profile.

In an embodiment, a new threshold parameter value is selected whenever a higher quality channel estimate is desirable. For example, a new threshold parameter value may be selected if a packet is decoded in error. The new threshold parameter value may be obtained as follows:

$$P_{new} = P_{old} + \Delta P, \text{ or} \qquad \text{Eq (15)}$$

$$P_{new} = P_{old} - \Delta P,$$

where $P_{old}$ is the old/current threshold parameter value,
$P_{new}$ is the new threshold parameter value, and
$\Delta P$ is a step size, which may be set to 0.25 or some other value.

A new channel estimate may be derived based on the new threshold parameter value and used to recover the packet. If the packet is still decoded in error with the new channel estimate, then another threshold parameter value may be selected and used to derive another channel estimate, which may then be used to recover the packet. In general, any number of channel estimates may be derived with different threshold parameter values. New threshold parameter values may be selected from both sides of the original threshold parameter value in alternate manner. For example, the new threshold parameter value may be set to $P_{old} + \Delta P$, then to $P_{old} - \Delta P$, then to $P_{old} + 2\Delta P$, then to $P_{old} - 2\Delta P$, and so on. A new threshold parameter value may be selected and used until the packet is decoded correctly, the maximum number of values has been tried, or some other termination condition is encountered. If the packet is decoded correctly, then the threshold parameter value that results in successful decoding may be used for subsequent packets. Selection of a new threshold parameter value may also be triggered by other events besides packet error.

Figure 5:
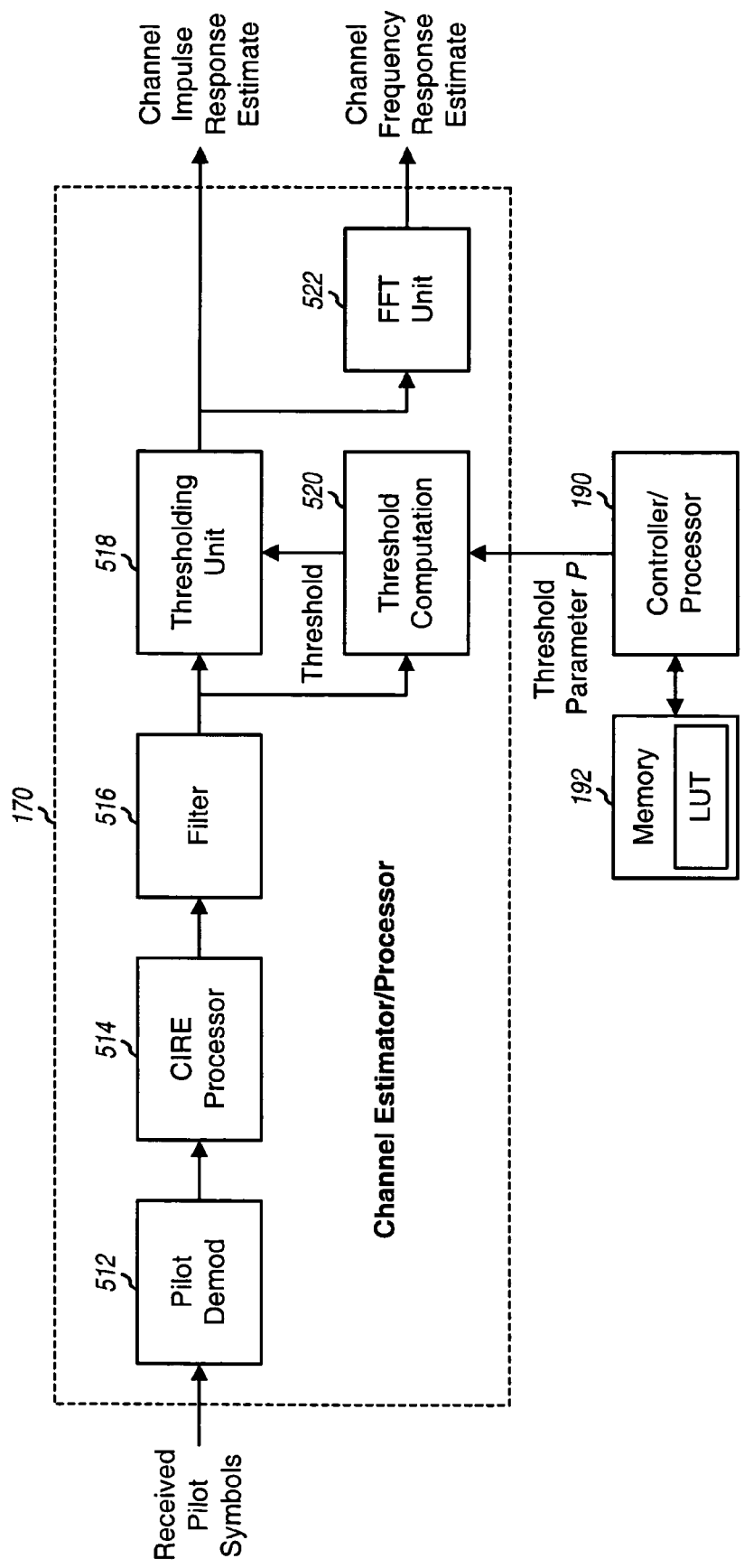
FIG. 5 shows a block diagram of a channel estimator/processor at the receiver.

FIG. 5 shows a block diagram of an embodiment of channel estimator/processor 170 in FIG. 1. Within channel estimator/processor 170, a pilot demodulator (Demod) 512 removes the modulation on received pilot symbols and also provides zero symbols for unused pilot subbands. A CIRE processor 514 derives an initial CIRE for the current symbol period based on the output of pilot demodulator 512. CIRE processor 514 may derive the initial CIRE based on the least-squares technique shown in equation (6), the MMSE technique shown in equation (7), the robust MMSE technique shown in equation (8), or some other technique. A filter 516 filters the initial CIREs for different symbol periods, e.g., as shown in equations (9), (10) and (11), and provides a filtered CIRE for the current symbol period.

Controller 190 ascertains the current operating scenario and selects an appropriate threshold parameter value for the current operating scenario. Memory 192 may store a look-up table (LUT) of different threshold parameter values for different operating scenarios. A threshold computation unit 520 derives the threshold $T_h(n)$ for the current symbol period based on the filtered CIRE and the threshold parameter value, e.g., as shown in equations (12) and (13). A unit 518 performs thresholding on the channel taps of the filtered CIRE based on the threshold from unit 520 and provides a final CIRE for the current symbol period. An FFT unit 522 may derive a channel frequency response estimate, if needed, based on the final CIRE.

Figure 6:
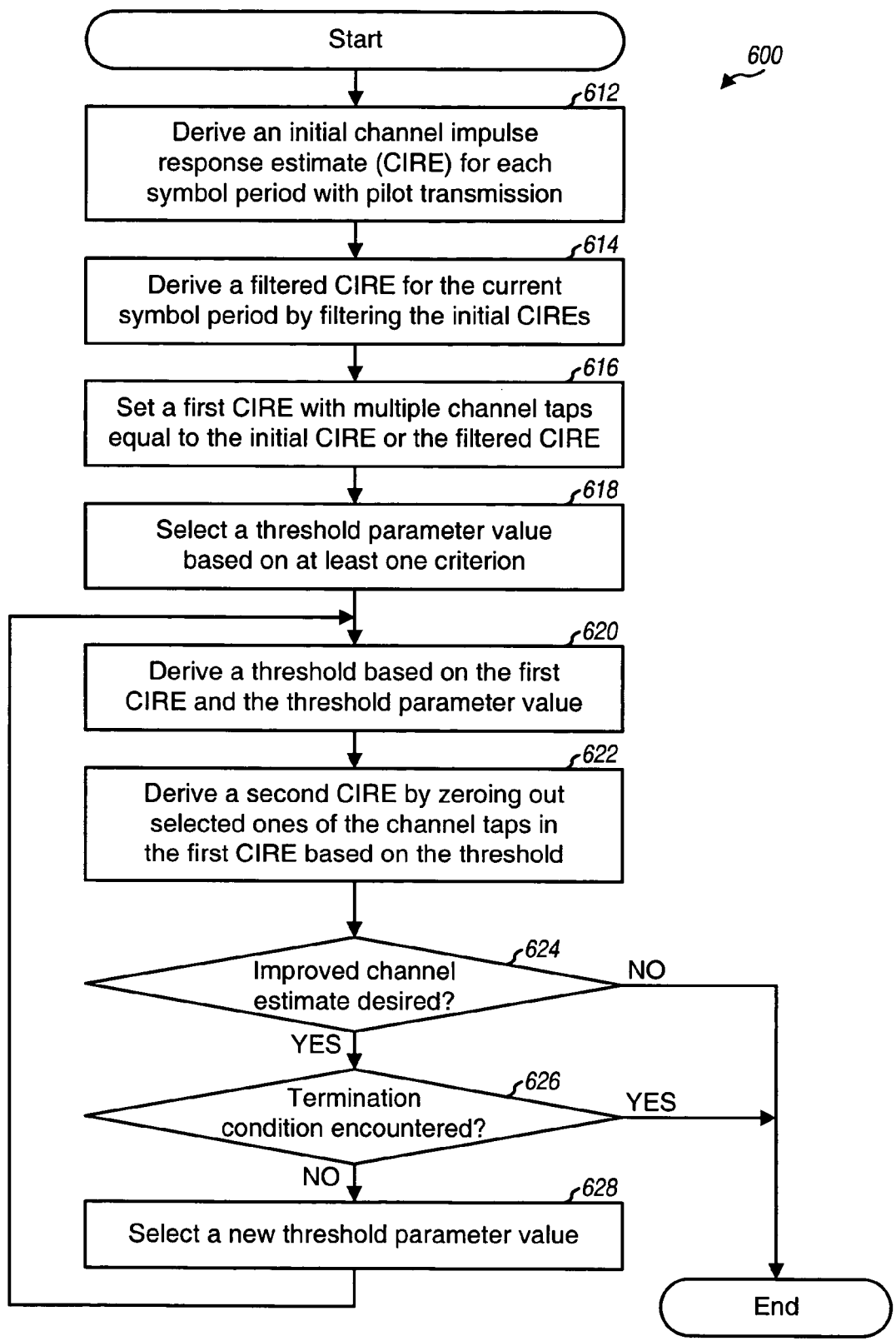
FIG. 6 shows a process for performing channel estimation with thresholding.

FIG. 6 shows an embodiment of a process 600 for performing channel estimation with thresholding. An initial CIRE is derived for each symbol period with pilot transmission (block 612). The initial CIRE may be derived based on received pilot symbols for used pilot subbands and zero symbols for zeroed-out pilot subbands. The initial CIRE may also be derived based on the least-squares, MMSE, robust MMSE, zero-forcing, or some other technique. A filtered CIRE is derived for the current symbol period by filtering the initial CIREs for the current, prior and/or future symbol periods (block 614). A first CIRE having multiple channel taps may be set to the initial CIRE or the filtered CIRE for the current symbol period (block 616).

A threshold parameter value is selected based on at least one criterion (block 618). For example, the threshold parameter value may be selected based on the channel profile, the operating SNR, the number of channel taps, and so on. A threshold is derived based on the first CIRE and the threshold parameter value (block 620). In an embodiment, the average energy of the channel taps in the first CIRE is determined, and the threshold is derived based on the average energy and the threshold parameter value. A second CIRE is derived by zeroing out selected ones of the channel taps in the first CIRE based on the threshold (block 622). In an embodiment, channel taps with energy less than the threshold are zeroed out to obtain the second CIRE. The second CIRE may also be derived by performing thresholding on the channel taps in other manners.

A determination is then made whether an improved channel estimate is desired (block 624). An improved channel estimate may be desired if a packet is decoded in error. If the answer is 'Yes' for block 624 and if a termination condition is not encountered in block 626, then a new threshold parameter value is selected, e.g., by varying the current threshold parameter value by $\Delta P$ (block 628). The process then returns to block 620 to (1) determine a new threshold based on the new threshold parameter value and (2) derive a new second CIRE by zeroing selected ones of the channel taps of the first CIRE based on the new threshold. Blocks 620 through 628 may be performed any number of times until a termination condition is encountered. If an improved channel estimate is not desired, as determined in block 624, or if a termination condition is encountered, as determined in block 626, then the process terminates.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to derive a first channel impulse response estimate (CIRE) having multiple channel taps, a second CIRE by zeroing out a percentage of the multiple channel taps based on a threshold parameter value;
   the at least one processor configured to determine a new threshold parameter value based on the second CIRE and zeroing out a further percentage of the multiple channel taps based on the new threshold parameter value; and
   a memory coupled to the at least one processor.

2. The apparatus of claim 1, wherein the at least one processor derives a threshold based on the multiple channel taps and the threshold parameter value.

3. The apparatus of claim 1, wherein the at least one processor determines an average energy of the multiple channel taps, derives a threshold based on the average energy and the threshold parameter value, and derives the second CIRE by zeroing out channel taps with energy less than the threshold.

4. The apparatus of claim 1, wherein the at least one processor is configured to determine whether the second CIRE channel estimate improvement is desired prior to determining the new threshold parameter value.

5. The apparatus of claim 4, wherein improvement of the second CIRE is desired when a packet is decoded in error.

6. An apparatus comprising:
at least one processor configured to derive a first channel impulse response estimate (CIRE) having multiple channel taps, select a threshold parameter value based on at least one criterion, derive a second CIRE by zeroing out selected ones of the multiple channel taps based on the threshold parameter value, ascertain whether a packet is decoded in error and, if the packet is decoded in error, select a new threshold parameter value and derive a new second CIRE by zeroing out selected ones of the multiple channel taps based on the new threshold parameter value; and
a memory coupled to the at least one processor.

7. An apparatus comprising:
at least one processor configured to derive a first channel impulse response estimate (CIRE) having multiple channel taps, ascertain an operating signal-to-noise ratio (SNR) of the channel, to select a threshold parameter value based on the operating SNR, and to derive a second CIRE by zeroing out selected ones of the multiple channel taps based on the threshold parameter value; and
a memory coupled to the at least one processor;
wherein the at least one processor selects different threshold parameter values and derives different second CIREs based on the first CIRE and the different threshold parameter values until a packet is decoded correctly or a termination condition is encountered.

8. An apparatus comprising:
at least one processor configured to derive a first channel impulse response estimate (CIRE) having multiple channel taps, to select a threshold parameter value, and to derive a second CIRE by zeroing out selected ones of the multiple channel taps based on the threshold parameter value; and
a memory coupled to the at least one processor;
wherein the memory stores a table of threshold parameter values for different operating scenarios, and wherein the at least one processor is configured to select the threshold parameter value from the table based on current operating scenario that includes coding and modulation scheme of the apparatus.

9. The apparatus of claim 8, wherein the current operating scenario comprises a channel profile.

10. The apparatus of claim 9, wherein the channel profile further comprises at least one signal delay and at least one signal power.

11. An apparatus comprising:
at least one processor configured to derive initial channel impulse response estimates (CIREs) for multiple symbol periods based on received pilot and derive a first CIRE having multiple channel taps by filtering the initial CIREs, to select a threshold parameter value based on at least one criterion, and to derive a second CIRE by zeroing out selected ones of the multiple channel taps based on the threshold parameter value; and
a memory coupled to the at least one processor.

12. The apparatus of claim 11, wherein the multiple symbol periods comprise a current symbol period, at least one prior symbol period, and at least one future symbol period.

13. The apparatus of claim 11, wherein the multiple symbol periods comprise a current symbol period and at least one prior symbol period.

14. The apparatus of claim 11, wherein the multiple symbol periods comprise a current symbol period and at least one future symbol period.

15. A method of selecting a threshold parameter for channel estimating, comprising:
deriving a first channel impulse response estimate (CIRE) having multiple channel taps;
selecting a threshold parameter value based on at least one criterion; and
deriving a second CIRE by zeroing out selected ones-of the multiple channel taps based on the threshold parameter value;
wherein the selecting the threshold parameter value comprises selecting the threshold parameter value based on channel profile that includes at least one signal delay value to an apparatus, wherein at least one of the above acts is performed by a processor;
ascertaining whether a packet is decoded in error; and if the packet is decoded in error, selecting a new threshold parameter value, and
deriving a new second CIRE by zeroing out selected ones of the multiple channel taps based on the new threshold parameter value.

16. A method of selecting a threshold parameter for channel estimating, comprising:
deriving a first channel impulse response estimate (CIRE) having multiple channel taps;
selecting a threshold parameter value based on at least one criterion;
deriving a second CIRE by zeroing out selected ones of the multiple channel taps based on the threshold parameter value; and
deriving initial CIREs for multiple symbol periods based on received pilot;
wherein the deriving the first CIRE comprises filtering the initial CIREs to obtain the first CIRE, wherein at least one of the above acts is performed by a processor.

17. An apparatus comprising:
means for deriving a first channel impulse response estimate (CIRE) having multiple channel taps;
means for selecting a threshold parameter value based on at least one criterion; and
means for deriving a second CIRE by zeroing out a percentage of the multiple channel taps based on the threshold parameter value;
wherein the means for selecting the threshold parameter value comprises means for selecting the threshold parameter value based on channel profile that includes at least one signal delay value to the apparatus;
means for ascertaining whether a packet is decoded in error;
means for selecting a new threshold parameter value if the packet is decoded in error; and
means for deriving a new second CIRE, if the packet is decoded in error, by zeroing out selected ones of the multiple channel taps based on the new threshold parameter value.

18. An apparatus comprising:
means for deriving a first channel impulse response estimate (CIRE) having multiple channel taps;
means for selecting a threshold parameter value based on at least one criterion;
means for deriving a second CIRE by zeroing out selected ones of the multiple channel taps based on the threshold parameter value; and
means for deriving initial CIREs for multiple symbol periods based on received pilot; wherein the means for deriving the first CIRE comprises means for filtering the initial CIREs to obtain the first CIRE.

19. An apparatus comprising:
at least one processor configured to derive a first channel impulse response estimate (CIRE) having multiple channel taps, to select a threshold parameter value based on at least one criterion, wherein the at least one criterion comprises a coding rate of received data, and to derive a second CIRE by zeroing out selected ones of the multiple channel taps based on the threshold parameter value; and
a memory coupled to the at least one processor.

20. The apparatus of claim 19, wherein the threshold parameter value varies inversely with the coding rate.

21. An apparatus comprising:
at least one processor configured to derive a first channel impulse response estimate (CIRE) having multiple channel taps, to select a threshold parameter value based on at least one criterion, wherein the at least one criterion comprises a modulation scheme of received data, and to derive a second CIRE by zeroing out selected ones of the multiple channel taps based on the threshold parameter value; and
a memory coupled to the at least one processor.

22. The apparatus of claim 21, wherein the threshold parameter value varies inversely with a number of constellation points of the modulation scheme.

* * * * *